US005351398A

United States Patent [19]

Haxell

[11] Patent Number: 5,351,398

[45] Date of Patent: Oct. 4, 1994

[54] FUEL INJECTION NOZZLES

[75] Inventor: John Haxell, Suffolk, England

[73] Assignee: Lucas Industries public limited company, Solihull West Midlands, United Kingdom

[21] Appl. No.: 18,663

[22] Filed: Feb. 17, 1993

[30] Foreign Application Priority Data

Feb. 19, 1992 [GB] United Kingdom .............. 9203658.1

[51] Int. Cl.$^5$ .............................................. B23P 15/00

[52] U.S. Cl. .......................... 29/890.142; 29/890.143; 239/533.2

[58] Field of Search ................... 29/890, 142, 890.143, 29/527.2, 527.4; 239/533.2

[56] References Cited

U.S. PATENT DOCUMENTS 4,801,095 1/1989 Banzhaf et al. .

5,075,968 12/1991 Stadder et al. ................. 29/890.142

FOREIGN PATENT DOCUMENTS 0219591 4/1987 European Pat. Off. .

2451536 5/1976 Fed. Rep. of Germany .

2725707 12/1978 Fed. Rep. of Germany .

0065217 5/1979 Japan .............................. 29/890.142

62-017364 1/1987 Japan .

*Primary Examiner*—Irene Cuda

*Attorney, Agent, or Firm*—Jenner & Block

[57] ABSTRACT

A fuel injection nozzle includes a body in which is formed a blind bore. An outlet orifice communicates with the blind end of the bore and adjacent the blind end of the bore is a seating which in use is engageable by a valve member. The body is formed from hardenable material and the nozzle body is formed in such a way that the seating surface has a high hardness value, the hardness value of the material diminishing to the exterior surface of the body. This is achieved by machining the exterior surface to remove a hardened layer or a hardenable layer produced during a carburizing operation.

6 Claims, 1 Drawing Sheet

FUEL INJECTION NOZZLES

This invention relates to fuel injection nozzles and to a method of manufacturing same, for supplying fuel to compression ignition engines the nozzles being of the kind comprising a nozzle body having at one end a nozzle tip in which is formed an outlet orifice, the orifice communicating with the blind end of a bore extending within the nozzle body, the bore defining a seating adjacent the blind end thereof and the seating in use being engaged by the complementarily shaped end of a valve member movable in the bore.

Such nozzles are well known in the art and the valve member is usually biased by a spring into engagement with the seating and is lifted from the seating by the action of fuel under pressure. Modern engine requirements dictate an increased fuel injection pressure and this means that the nozzle tip is subject to increased stress due both to the increased fuel pressure and the higher impact forces on the seating when the valve member engages therewith. It is not always possible to alter the shape and size of the nozzle tip in order to increase its strength because of other considerations such as the length of the orifice and its disposition.

It is known in the art to harden the inner and outer surfaces of the tip and the adjacent portions of the nozzle body including the seating, in order to enhance the life expectancy of the nozzle but as stated it is not always possible to increase the thickness of the wall of the tip in order to reduce the stresses in the material.

U.S. Pat. No. 4,801,095 discloses a fuel injection nozzle and various methods of making same, in which the hardness value of the material at the seating surface is high and then diminishes as the distance from the seating surface increases. The hardness value however is arranged to rise as the external surface is approached but at the external surface the hardness value is less than that of the seating surface.

Investigation has shown that whilst nozzles constructed and having the hardness profile, as described in U.S. Pat. No. 4,801,095 represent an improvement over nozzles in which the internal and external hardness values are substantially equal, they are still not able to cope adequately with the increased fuel pressures now required.

The object of the present invention is to provide a method of manufacturing and a fuel injection nozzle of the kind specified in a simple and convenient form.

According to the invention a fuel injection nozzle of the kind specified is characterized in that the hardness value of the material forming the tip and the adjacent portions of the nozzle body in the region of the seating decreases from the inner to the outer surfaces thereof.

Figure 1:
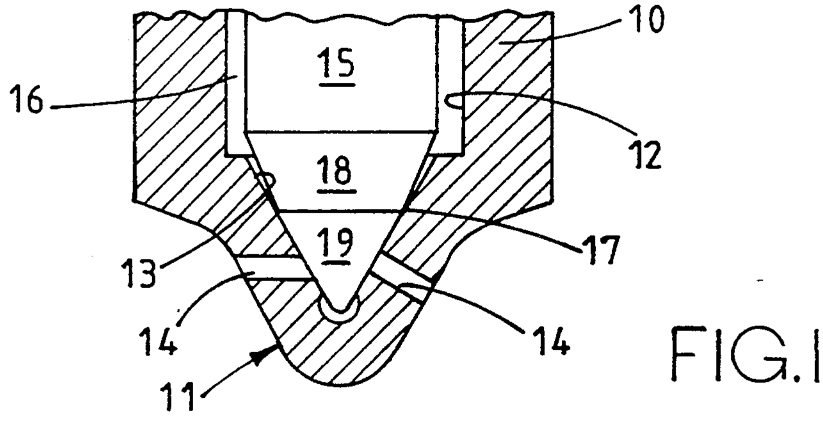
Figure 2:
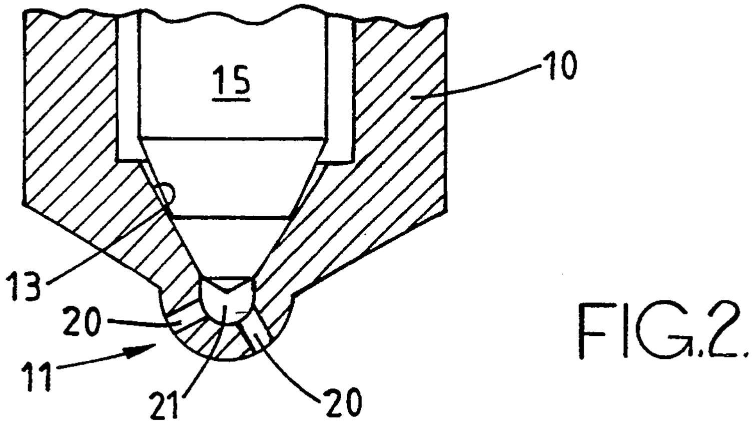
Figure 3:
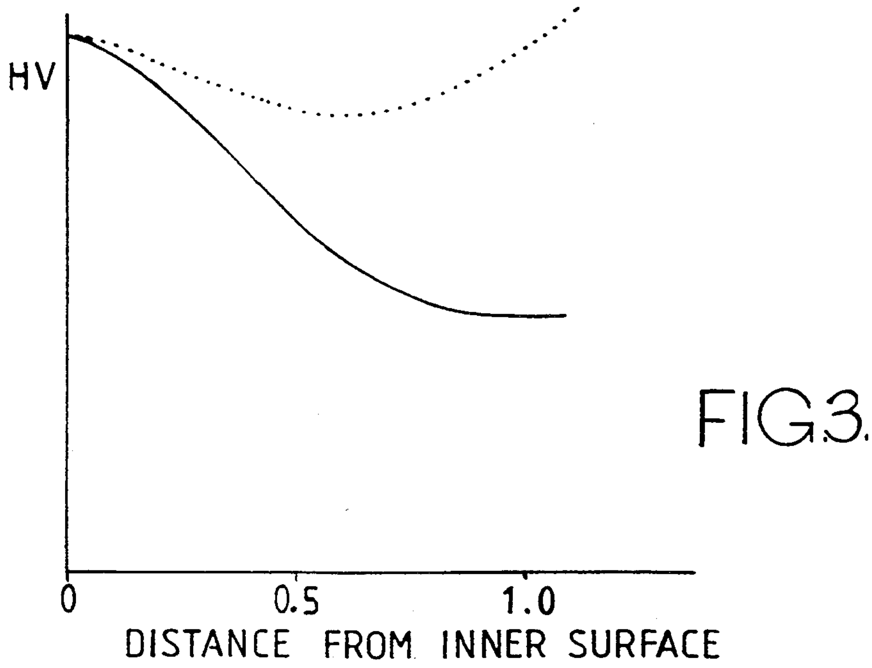

In the accompanying drawings:

FIG. 1 shows in part sectional side elevation, one example of a fuel injection nozzle, FIG. 2 shows a view similar to FIG. 1 of a different form of nozzle, and FIG. 3 is a graph showing hardness values relative to the depth of the material from a surface thereof.

Referring to FIGS. 1 and 2 of the drawings, two forms of a fuel injection nozzle with which the present invention is concerned are shown. The nozzle which is shown in FIG. 1 comprises a nozzle body 10 having an integral tip 11. Within the body is a blind bore 12 at the blind end of which is formed a frusto-conical seating 13. Formed in the tip are outlet orifices 14 the inner ends of which open onto the seating 13. Slidable in the bore is a valve member 15 which adjacent the seating is of reduced diameter to define with the bore an annular space 16 which in the use of the nozzle is connected to an outlet of a high pressure fuel injection pump (not shown). The end of the valve member is formed to define a seating line 17, this being defined at the junction of a frusto-conical section 18 having a cone angle slightly less than that of the seating, and a conical section 19 which in practice has a cone angle slightly greater than that of the seating.

The valve member 15 is biased by a spring (not shown) into engagement with the seating and the valve member also defines a surface against which fuel under pressure can act to lift the valve member from the seating thereby to allow fuel flow through the orifices 14. In the closed position of the valve member the inner ends of the orifices are effectively closed by the conical portion of the valve member and this type of nozzle is known in the art as a VCO nozzle.

The nozzle shown in FIG. 2 is substantially the same but in this case the inner ends of the orifices 20 open into a so-called sac volume 21 which is formed in the tip.

In the manufacture of the nozzles the nozzle body and tip are machined from a suitable blank of steel which is capable of being case hardened. The internal surfaces in particular the seating are machined to a size which will allow for fine finishing but the outer surfaces of the tip and the adjacent portions of the body are machined over size. The machined blank is then subject to a case hardening process followed by a heat treatment process and the result is that the inner surfaces including the seating and the outer surfaces of the tip and the adjacent portions of the body have a high hardness value. A typical value at the surface is 700 HV, the hardness value decreasing as the distance from the surface increases but increasing again as the other surface is approached. The dotted line in FIG. 3 shows the hardness profile of a conventional nozzle but it also illustrates the variation of hardness value in the part finished blank.

The blank is then subjected to a further machining operation which removes material from the outer surfaces of the tip and the adjacent portions of the body so that the blank has the dimensions of the finished nozzle. In removing the material the case hardened outer surfaces are removed and the initial machined dimensions of the blank and the intensity of case hardening are chosen so that in the finished nozzle as shown by the full line in FIG. 3, the hardness value decreases from the inner surfaces to the finished outer surfaces. A typical hardness value at the outer surface lies between 400 and 500 HV this depending on the material forming the blank.

In a typical nozzle of the type seen in FIG. 1 the thickness of the wall of the nozzle in the region of the orifice 14, after case hardening is 2.1 mm. The fine finishing operation of the seating involves the removal of 0.06 mm of material and 0.8 mm of material is removed from the external surface. The final wall thickness of the wall of the bore 12 is 1.7 mm the thickness prior to removal of material from the external surface being 2.75 mm.

Following the removal of what can be termed the excess material, the orifices 14 or 20 are machined conveniently using EDM techniques or other suitable techniques and the seating is fine finished a process which removes very little of the hardened surface.

As an alternative the orifices can be drilled using conventional drills when the material is in a soft state. The process as described is therefore modified in that following the carburizing step in the hardening process, the material is softened by annealing and the orifices drilled. The material is then hardened and then the excess of material removed from the outer surfaces of the tip and the seating fine finished as described.

A preferred method of forming the nozzle body is to start with a length of oversize bar and to form in the bar by drilling, the center bore, the seating and if required, the sac volume. These are formed to a size which will permit fine finishing. The blank thus formed is then carburizing to achieve carbon penetration of the internal and external surfaces and then the blank is heat treated to soften the material.

The external surface of the blank is then machined to produce the desired tip profile and the orifices are drilled or otherwise formed. In removing material to form the tip and the adjacent end surface of the blank the external carburizing layer is removed so that the external surface is uncarburizing. The blank is then hardened by suitable heat treatment and the bore and seating and if necessary the wall of the sac volume are fine finished to the required dimensions. The end result is a nozzle body the material of which has a high hardness value at the seating surface, the hardness value diminishing to the external surface.

In another example the nozzle body is first machined to the required size and then the outer surfaces are coated to prevent carbon impregnation during the carburizing stage of the nozzle body. The coating may be an electroplated layer or it may be a "clay" which is applied to the outer surfaces. Following carburizing the nozzle body can be annealed and the orifices drilled using conventional drills followed by a hardening process which produces a hardened layer only on the inner surfaces of the nozzle body. Alternatively the orifices can be formed using EDM or similar techniques after the hardening stage.

In each case the resulting nozzle body has a hardness value which decreases outwardly from the inner surfaces and furthermore, the surfaces of the walls of the orifices are not hardened except adjacent the seating.

I claim:

1. A method of manufacturing a fuel injection nozzle of the kind comprising a nozzle body having at one end a nozzle tip in which is formed an outlet orifice which communicates with the blind end of a bore formed in the nozzle body, the bore having a seating formed therein adjacent the blind end, comprising the steps of selecting a blank of hardenable material, machining the blank to form the bore and the seating, the machined size of the seating being such that the seating can be fine finished, subjecting the machined blank to a case hardening process followed by heat treatment, machining the outer surface of the blank at least in the region of the tip to remove the outer hardened layer and fine finishing the seating so that at least in the region of the seating the hardness value of the material diminishes to the exterior surface of the body.

2. A method according to claim 1, including the further step of machining the orifice.

3. A method according to claim 1, in which the case hardening process includes a carburizing step and following the carburizing step in the case hardening process the material is softened by annealing and the orifice drilled, the material then being hardened prior to the fine finishing of the seating and the removal of the outer hardened layer.

4. A method of manufacturing a fuel injection nozzle of the kind comprising a nozzle body having at one end a nozzle tip in which is formed an outlet orifice which communicates with the blind end of a bore formed in the nozzle body, the bore having a seating formed therein adjacent the blind end, comprising the steps of selecting a blank of hardenable material, machining in the blank the bore and the seating to a size which will permit fine finishing, the external surfaces of the blank being oversize, subjecting the blank to a carburizing operation to achieve carbon penetration of the inner and outer surface layers, heat treating the blank to soften the material, machining the external surfaces of the blank to form the desired tip profile and to remove the outer carburized surface layer, machining the orifice, hardening the material forming the blank to produce a high hardness value at the seating surface with a hardness value diminishing to the exterior surface and fine finishing the bore and the seating.

5. A method of manufacturing a fuel injection nozzle of the kind comprising a nozzle body having at one end a nozzle tip in which is formed an outlet orifice which communicates with the blind end of a bore formed in the nozzle body, the bore having a seating formed therein adjacent the blind end, comprising the steps of selecting a blank of hardenable material, machining in the blank the bore and the seating to a size which will permit of fine finishing, machining the external surfaces of the blank to the finished size, coating the external surfaces to prevent carbon penetration, subjecting the blank to a carburizing operation to achieve carbon penetration of the inner surface layer only, heat treating the blank to soften the material, machining the orifice, hardening the material forming the blank to produce a high hardness value at the seating surface with a hardness value diminishing to the exterior surface and fine finishing the boar and the seating.

6. A method of manufacturing a fuel injection nozzle of the kind comprising a nozzle body having at one end a nozzle tip in which is formed an outlet orifice which communicates with the blind end of a bore formed in the nozzle body, the bore having a seating formed therein adjacent the blind end, comprising the steps of selecting a blank of hardenable material, machining in the blank the bore and the seating to a size which will permit of fine finishing, machining the external surfaces of the blank to the finished size, coating the external surfaces to prevent carbon penetration, subjecting the blank to a carburizing and hardening process so as to produce a high hardness value at the seating surface with the hardness value diminishing to the exterior surface, machining the orifice and fine finishing the bore and seating.

* * * * *